United States Patent [19]
Gombas

[11] Patent Number: 5,768,931
[45] Date of Patent: Jun. 23, 1998

[54] ARTICLE PROCESSING MACHINE

[76] Inventor: Laszlo A. Gombas, 23768 Shooting Star Dr., Golden, Colo. 80401

[21] Appl. No.: 764,848

[22] Filed: Dec. 13, 1996

[51] Int. Cl.$^6$ .................................................. B21D 51/26
[52] U.S. Cl. .................................. 72/184; 72/94; 72/356
[58] Field of Search ............................. 72/184, 94, 356, 72/404, 442, 449, 405.03, 190; 413/69; 74/813 R, 820, 825, 813 L

[56] References Cited

U.S. PATENT DOCUMENTS

| | | | |
|---|---|---|---|
| 2,014,706 | 9/1935 | Sullivan | 113/1 |
| 2,086,849 | 7/1937 | Bullard et al. | 29/50 |
| 2,956,610 | 10/1960 | Diezel | 153/59 |
| 3,446,167 | 5/1969 | Armbruster et al. | 113/7 |
| 3,572,173 | 3/1971 | Woltjen | 74/815 |
| 3,815,402 | 6/1974 | Duran et al. | 72/94 |
| 4,030,432 | 6/1977 | Miller et al. | 113/7 R |
| 4,037,493 | 7/1977 | Freer | 74/820 |
| 4,272,977 | 6/1981 | Gombas | 72/121 |
| 4,513,595 | 4/1985 | Cvacho . | |
| 5,150,594 | 9/1992 | Pazzaglia | 72/92 |
| 5,353,619 | 10/1994 | Chu et al. | 72/121 |

*Primary Examiner*—Lowell A. Larson
*Attorney, Agent, or Firm*—Kyle W. Rost

[57] ABSTRACT

A central turret rotates continuously on a central axis and carries a plurality of planetary turrets that rotate on their own axes. An index drive intermittently moves each planetary turret through a cycle consisting of both a period of rotation through a fraction of a revolution on the planetary turret axis and a period of dwell at an indexed position. The planetary turrets each carry a plurality of tool heads, and during successive periods of dwell, a successive one of the tool heads is presented to a workstation. A workpiece carrier supports a workpiece in proximity to the workstation. Rams operatively engage the workpiece and tool head as the successive tool heads dwell at the workstation. In this way, a workpiece is processed by a plurality of tool heads during a single revolution around the central axis.

26 Claims, 7 Drawing Sheets

ARTICLE PROCESSING MACHINE

TECHNICAL FIELD

The invention generally relates to metal deforming by use of a closed die and co-acting work forcer, particularly with plural or repeated work forming steps. Similarly, the invention broadly relates to metal deforming with a means to drive the tool, including a gear actuated tool support. Further, the invention relates to metal deforming with a tool carrier, such as a press frame, with a guide for rectilinearly moving the tool. According to another aspect, the invention generally relates to a machine element or mechanism including rotary member or shaft indexing, e.g., tool or work turret. More specifically, the invention relates to a machine element or mechanism having sequential preselected indexed positions with gear drive. Finally, the invention generally relates to sheet metal container making, more specifically to apparatus for can body making, with body deforming such as beading, necking, or flanging. The invention discloses a can body processing machine in which a plurality of index driven turrets in planetary positions revolve about a continuously driven central shaft.

BACKGROUND ART

The technology of forming a single metal beverage container involves numerous steps and many different machines, such that each manufacturer must build a can plant or at least dedicate a substantial amount of plant area to housing a can line. The term, "can line," generally refers to the series of machines that are necessary to perform all forming and finishing steps in manufacturing a metal beverage container to the point where it is ready to be filled. Thus, in a typical can line, machines would perform the steps of blanking, cupping, drawing, redrawing, ironing, doming, trimming, surface decorating, internal coating, necking, and flanging.

Certain of these steps are performed a multiple of times on each can body, and those repeated operations are combined in one machine, when possible. For example, a metal can body is ironed three times, and the multiple ironing dies typically are arranged sequentially along the stroke of a single punch, which then causes the can wall to be ironed several times in rapid succession. Other steps are performed only once per can, but they, too, are combined in a single machine where practical. For example, the same punch that moves the can body through the ironing dies performs two other functions. The starting workpiece is a cup, which the punch forces through a redraw die that precedes the ironing dies. At the end of its stroke, this punch pushes the bottom of the can body against a doming die. Thus, one stroke of the ironing punch performs five distinct steps. U.S. Pat. No. 3,446,167 to Armbruster similarly outlines the problem and its early solution.

In another example, a combined cupper punch and die cuts a can blank from sheet stock in a first part of its stroke. The cupper punch continues the stroke, forcing the can blank through a cupping die. Although blanking and cupping might be considered two distinct steps, their combination eliminates a considerable amount of intermediate handling, saves floor space in the can line, and eliminates the need for a separate machine to perform only one of the functions.

In the examples given above, it was practical to combine forming steps because each step followed the preceding step both in time and position, using substantially the same equipment. Thus, once the blank was cut, it was entirely reasonable to continue the motion of the cupper punch and push the blank through a cupping die. However, at that point, the sequence stops because further forming requires that a smaller ironing punch replace the cupper punch. Once the cup is transferred to the ironing machine having a smaller punch, the steps of redrawing the cup, repeatedly ironing its sides, and doming the bottom wall can be performed on a single machine, because the same size punch participates in all of the latter steps.

Current technology favors necking the container body multiple times, in order to achieve a greatly necked-in end. The favored method is die necking, which pushes the end into a static die ring to slightly neck-in the end. After insertion, the container body is pushed out of the die ring in the reverse direction. Further sequential necking steps repeat the initial process, employing dies with progressively smaller die openings. Thus, since the container body is withdrawn from the necking die instead of passing through it, there is no way to employ the prior art methods by combining several repetitions of necking along a single stroke of a punch. Instead, the container body is moved from machine to machine and subjected to one step of die necking at each machine. Cluster machines carry several necking stations by combining the equivalent of a plurality of individual necking machines on a common base or frame. Each machine in the cluster operates on its own central axis, and the container body is necked only one time on its path around each central shaft or axis. Thus, the multiple necking in a cluster machine still takes place at the rate of one necking step per circuit around a central axis, just as it would if a plurality of individual machines were lined-up in the can line. In the case of either a cluster machine or a series of individual machines operating in series or sequential operation, the large number of can transfers remains a substantial problem. The transfer process is a likely source of damage to the can body. Each processing step of a cluster machine or of machines requires two transfers, which can lead to as many as ten transfers to accomplish a five step process. These cluster machines often are quite long, and although they offer small gains in efficiency over a series of separated individual machines, they continue to occupy a substantial length of the can line.

Other necking techniques are known, and some have attempted to reduce the multi-necking process to one machine. For example, spin forming is able to reduce the can neck by several sizes in a single operation. The present inventor also obtained U.S. Pat. No. 4,272,977 to Gombas, which discloses an early spin necker/flanger; and U.S. Pat. No. 5,353,619 to Chu et al shows a recent variation on this art. Unfortunately, spin forming is considered unreliable due to the large number of process variables in that system. For this reason, die necking remains the preferred technique.

It would be desirable to further integrate either sequential or repeated can forming steps in a single machine. The expected benefits would be those noted above An efficiently integrated machine likely would cost far less than either equivalent multiple machines or an agglomerate machine. Also, an integrated machine would occupy substantially less floor space in the can line. Further, integrated forming would reduce or eliminate the need for transfer and transport mechanisms, such as vacuum cups, pin chains, or transfer wheels that typically move the cans from machine-to-machine. One approach to such an integrated machine, which is now suggested in the present invention, is the use of a plurality of rotary, index driven turrets located in planetary positions about a continuously rotating central shaft. Such a structure offers a large number of processing stations in a machine of size similar to or only slightly larger than a typical single process necking machine. Each processing station could perform a different function, or the same function could be repeated at two or more of the stations. Thus, the use of planetary index driven turrets offers a new and greatly improved machine architecture for design of cost efficient and space efficient can lines.

Index mechanisms are known and used in many types of machines. U.S. Pat. No. 3,572,173 to Woltjen shows a basic index drive. This type of mechanism has been used for primary motions in various machines where it was required that the machine pause or "dwell" on an intermittent basis. However, the use of an index drive on a planetary turret, orbiting a continuously rotating main shaft, is not known.

For example, U.S. Pat. No. 2,014,706 to Sullivan discloses a rotary gear indexed can processing machine. In particular, Sullivan inserts a collar and spins the can and collar while at a single workstation.

U.S. Pat. No. 2,086,849 to Bullard et al discloses an indexing carrier that supports a plurality of work-holding chucks or spindles. The carrier moves the work for successive operations at various working stations. The exact work being performed is not specified. The indexing mechanism is a crank arm that is cam actuated to retract a lock pin from lock pin bits on the carrier. A central shaft rotates continuously and intermittently causes the lock pin to retract so that the carrier can advance by one station. Bullard shows a centrally carried index drive, rather than a continuously rotating machine with planetary index drives.

U.S. Pat. No. 4,037,493 to Freer discloses a rotary indexing mechanism that both rotates a platform and stops the platform at various workstations.

U.S. Pat. No. 2,956,610 to Diezel discloses a continuously rotating flanging machine in which opposed flanging dies are pushed into the opposite ends of a 3-piece can body. During portions of the operation, a roller is applied against the exterior of the flange.

U.S. Pat. No. 5,150,594 to Pazzaglia discloses a beading machine, in which the cans are carried on a rotating turret supporting small vertical mandrels. Outside the ring of mandrels is an outer rotating section that carries sectors having the desired beading profile. The cans are rolled between the mandrels and the sectors to obtain the desired profile. The can bodies are worked at fixed points where the sectors are encountered.

U.S. Pat. No. 4,030,432 to Miller et al discloses a trimmer in which the cans are mounted on spindles and rotated about a turret. At fixed locations, the cans encounter a fixed cutting blade that severs the scrap.

U.S. Pat. No. 4,513,595 to Cvacho discloses a cluster machine for necking and flanging, in which a pilot die inside the can body cooperates with a ring die positioned along the rotary path of the can.

While various patents and other examples in the prior art have employed indexing, none has achieved the efficient, multi-step processing structure made possible by use of index driven planetary turrets orbiting a continuously rotating main shaft.

To achieve the foregoing and other objects and in accordance with the purpose of the present invention, as embodied and broadly described herein, the machine and method of this invention may comprise the following.

DISCLOSURE OF INVENTION

Against the described background, it is therefore a general object of the invention to provide a multi-step processing machine that eliminates the need to transfer the workpiece between machines in order to accomplish the different steps.

Another object is to provide an improved, continuously rotating, multi-step processing machine in which the workpiece is subjected to a plurality of processing steps by reciprocal motion between the workpiece and the process tooling.

A related object is to provide a machine and method for multi-step reciprocal processing motions, with the result that the machine and method of this invention provide compound processing that is not limited to steps that could be performed along the continuous path of a single punch.

Another object is to provide a machine and method for multi-step processing that can be applied to a longitudinally limited portion of a tubular workpiece. Thus, processes such as multi-step die necking can be achieved in a single machine, without the previous limitation of requiring the tubular workpiece to pass through the tooling in order to complete plural steps within a single machine.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, an article processing machine provides a machine base that carries a central turret for rotation a central turret axis. A workpiece carrier defines a workstation and transports a workpiece through a processing cycle that includes receiving the workpiece into the workstation, conveying the workpiece in the workstation along a workpiece pathway about the central turret axis, and discharging the workpiece from the workstation. A planetary turret orbits the central turret axis, is rotatable about a planetary turret axis, and carries a plurality of tool heads along a tool head pathway positioned to successively bring each tool head to the workstation. An index drive device cycles a planetary turret about the planetary turret axis through alternating periods of indexed motion and dwell, wherein during successive periods of dwell, successive ones of the tool heads are positioned at the workstation. Suitable tooling operatively engages a tool head positioned at the workstation with a workpiece carried at the workstation.

According to another aspect, the invention provides a method of sequentially processing a workpiece by a plurality of tool heads. The steps of this method are, first, providing a plurality of tool heads, each capable of processing a workpiece located in a processing relationship to the tool head. The tool heads are moved along an annular tool head path according to an index cycle of alternating periods of index movement and dwell, in which at least one dwell position of each tool head is at a predetermined common point along the tool head path. Second, simultaneously with the first step, providing a workpiece station, moving along an annular workpiece path. Third, simultaneously with the second step, orbiting the tool head path about the workpiece path for movement with the workpiece station. Fourth, simultaneously with the third step, positioning the predetermined common point of the tool head path in sufficient proximity to the workpiece station that a tool head dwelling at the common point is positioned in processing relationship to the workpiece station. Fifth, placing a workpiece in the workpiece station, and conveying the workpiece along the workpiece path through a plurality of tool head index cycles. By these steps, the workpiece is processed by a plurality of the tool heads.

According to still another aspect, the invention provides an improved article processing machine of the type having a base carrying a central turret powered for rotation about a central turret axis; a workpiece carrier for transporting a workpiece about the central turret axis at a workstation; a plurality of tool heads carried by the central turret with at least one of the tool heads positioned at the workstation; and suitable tooling for operatively engaging the workpiece with the tool head at the workstation. The improvement includes a planetary turret rotatable about a planetary turret axis, wherein the planetary turret axis orbits the central turret axis; and the planetary turret carries a plurality of said tool heads at a predetermined radial separation from the planetary turret axis, for orbital rotation about the planetary turret axis. An index drive moves the planetary turret through repeated cycles of dwell and index movement about the planetary turret axis. During a dwell the index drive maintains one of the carried tool heads at said workstation; and during an index movement the index drive means changes the tool head at the workstation.

The accompanying drawings, which are incorporated in and form a part of the specification illustrate preferred embodiments of the present invention, and together with the description, serve to explain the principles of the invention. In the drawings:

BEST MODE FOR CARRYING OUT THE INVENTION

Figure 1:
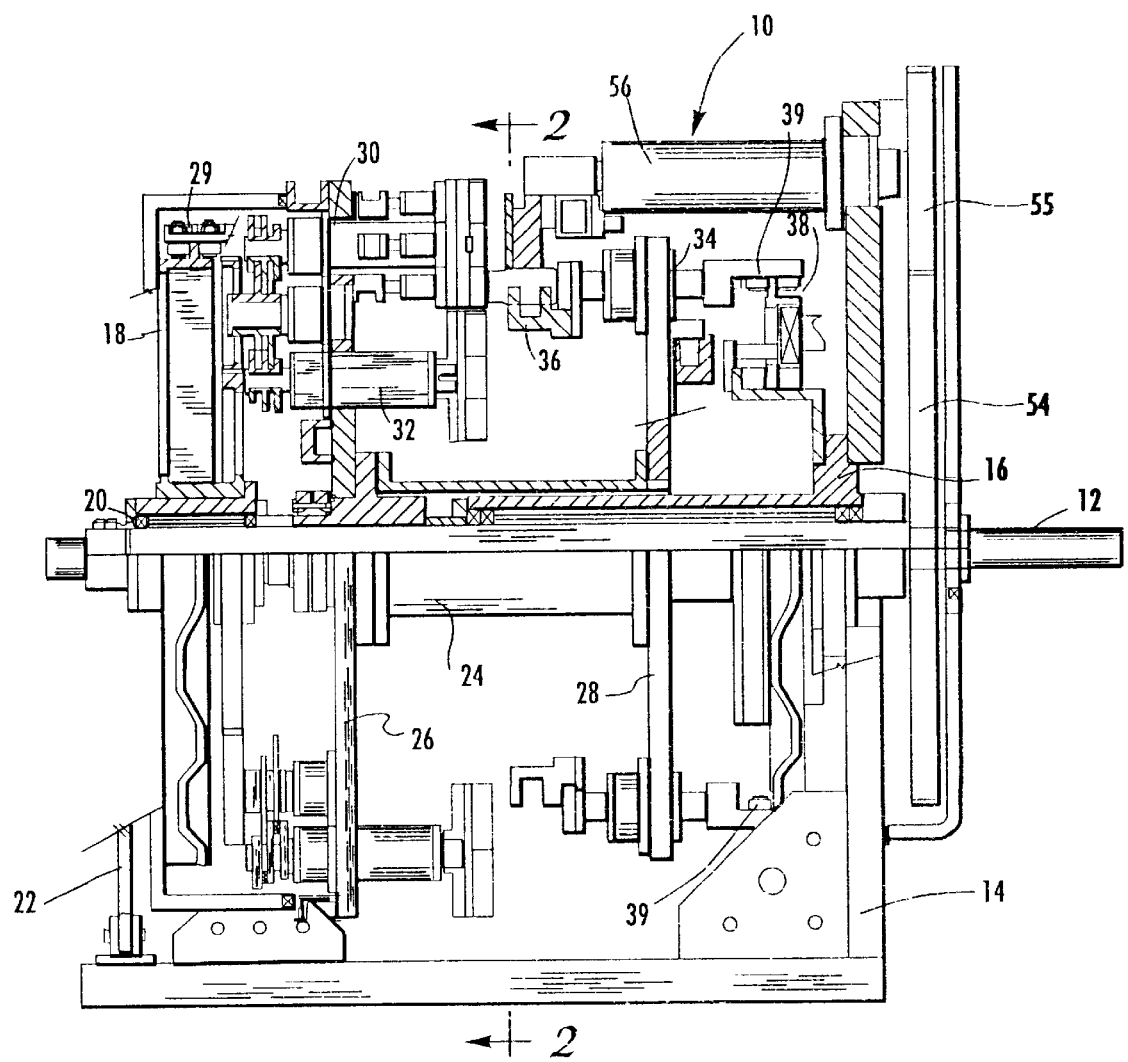
FIG. 1 is a side elevational view in partial cross-section of a representative machine employing the invention.

The invention is an article handling or processing machine that is capable of performing a plurality of processing steps while transporting a workpiece through a single revolution about the machine axis. The machine is composed of a base that carries a main or central turret that rotates continuously on a central turret axis. The central turret carries a plurality of planetary turrets that orbit the central axis in planetary positions. The planetary turrets are substantially identical, with each being rotatable about its own axis, which will be referred to as the "planetary axis." Each planetary axis is parallel to the central axis and is spaced from the central axis by a predetermined radial distance. All planetary axes may be spaced at the same distance, forming a single ring around the central axis; or the planetary axes may be spaced a two or more different radial distances, forming two or more rings around the central axis. Although the planetary turrets orbit the central axis, in the preferred embodiment the planetary axes have fixed positions relative to the central turret, itself, and rotate with the central turret in stationary orbital positions.

An index drive means causes a planetary turret to rotate about its planetary axis through a plurality of index cycles, each composed of a period of dwell and a period of index motion. The index cycle can be measured in degrees as the arc through which the central turret rotates on its axis while a planetary turret cycles through the combination of an index period and a dwell period. A dwell period can be measured in degrees as the arc through which the central turret rotates on its axis while a planetary turret cycles through a dwell period, i.e., while the planetary turret is not rotating on the planetary axis. An index period can be measured in degrees as the arc through which the central turret rotates on its axis while the planetary turret cycles through an index period, i.e., while the planetary turret is rotating on the planetary axis between dwell periods. An index stop is a predefined, fixed position of the planetary turret on the planetary axis during a dwell period, and the number of stops is measured as equal to the number of index cycles in one revolution of the planetary turret about the planetary axis. If the planetary turret rotates one full revolution per revolution of the main turret, then the number of stops also is equal to the number of index cycles measured around the central turret axis. The number of tool head stations on one planetary turret typically will be equal to the number of index stops.

An index drive mechanism performs two functions: first, it maintains the planetary turret in a stationary position about the planetary axis at an index stop through a dwell period or for a dwell time. Second, it causes the planetary turret to rotate with respect to the planetary axis through a predetermined arc of a revolution, which movement is referred to as "indexing" or "index movement" through an index period. Each index cycle rotates the planetary turret through an equal fraction of a revolution around the planetary axis, with the result that the planetary turret rotates through an equal arc between stops. In the preferred embodiment, the planetary turrets and the central turret are synchronized in their relative rotations, such that each planetary turret completes one revolution of its planetary axis in the same time that the planetary turret completes one orbit of the machine's central axis. Since the planetary turrets are carried on the central turret, the period for a planetary turret to complete one revolution of its planetary axis also is the period for the central turret to complete one revolution of the central axis.

The planetary turret is a tool head carrier and defines a tool head pathway that includes a plurality of tool head stations. A tool head station is a location on the planetary turret where a tool head might be located. If a tool head is to be placed at a station, then the station may be provided with a tool head carrying apparatus or receptacle. Alternatively, if no tool head is to be located at a particular station, the station may be blank or devoid of any particular receiving structures. The maximum number of tool head stations corresponds to the number of index stops. A circular planetary turret defines an annular tool head pathway, and the tool head stations may be located at a predetermined radius from the planetary axis. Juxtaposed tool head stations may be positioned along the tool head pathway at equidistant spacings, separated by equal circumferential arcs of a circle defined around the planetary axis by the tool head pathway. The arc between tool head stations is equal to the arc between index stops, with the result that at the stops, the tool head stations dwell in sequence at substantially identical points.

The central turret defines a workpiece pathway having a plurality of workpiece stations arranged at intervals along the workpiece pathway for carrying a workpiece. For example, a part of the central turret may be a workpiece carrier such as a star wheel, pocket wheel, or series of workpiece carrying devices. The workpiece carrier may be joined to the central turret for synchronized rotation in such a way that each workpiece station remains at a predetermined position with respect to the central turret. The workpiece pathway may be a circle centered on the central axis, with each workpiece station located at an equal radius from the central axis; and the workpiece stations may be spaced equidistantly about the circumference of the workpiece pathway. The number of workpiece stations is preferred to be equal to the number of planetary turrets.

Each workpiece station is associated with one planetary turret. More specifically, the associated planetary turret is positioned in such a way that during each dwell period, one of the tool head stations is positioned in working proximity to the workpiece station. In this arrangement, each workpiece station also may be termed a "workstation" and the tool head or tool head station positioned in proximity to the workpiece station during any dwell period will be referred to as being at the workstation. As the index drive moves the planetary turret through each successive index cycle, a different one of the tool head stations dwells at the workstation. In one complete revolution of the planetary turret about its planetary axis, each of the tool head stations will have been positioned at the workstation during the dwell period of one index cycle. The planetary turret and the workpiece station orbit the central axis together, which maintains each sequential tool head station at the workstation throughout a dwell period.

During operation, the planetary turret carries a tool head in each of a plurality of the tool head stations; and the workpiece station carries a workpiece. One tool head may be carried at each tool head station, or, as noted above, a tool head station may be empty. Typically, tool heads are carried in sequential tool stations, with one empty tool station positioned between the end and the beginning of the series of tool heads to provide space for loading and unloading the workpiece. The tool heads are of a type processing a workpiece when the workpiece and a tool head are in working proximity to each other, such as when each tool head is positioned at the workstation.

The details of how a workpiece and tool head are relatively positioned in working relationship at the workstation are dependent upon the nature of the tool head and the nature of the workpiece. Those skilled in the art are familiar with how to position a workpiece and tool head in order to process the workpiece. The following descriptions are representative examples:

When the workpiece is a tubular can body and the tool head is a necking die, then the tool head should be axially aligned with the workpiece, allowing process tooling such as rams to axially push together the tool head and can body. Other process tooling, such as a knock-out punch, could push apart the processed can body and the tool head. In this case, the workpiece station carries the can body in a position with the can body axis parallel to the central axis. The planetary turret carries the tool head with its axis parallel to the central axis as well, but in a plane slightly offset from the plane of the workpiece carrier. The offset allows the can body and tool head to assume an axially aligned relationship at the workstation, whereby the tool head and can body eclipse each other as viewed along the axis of alignment. After the can body is processed by the tool head, the index drive cycles the planetary turret and changes the tool head, bringing a second tool head to the workstation, in axial alignment with the can body. The process cycle is repeated as each tool head dwells at the workstation. When each of the tool heads in sequence has performed its function, the empty tool head station will dwell at the workstation. During this portion of the cycle, an outfeed removes the processed workpiece from the carrier and an infeed loads an unprocessed workpiece in the carrier.

Another type of tool head may require a radial approach. In this case, the tool head and workpiece may lie along parallel axes. Process tooling may move the workpiece and tool head relatively together along a radius of the planetary turret or workpiece carrier, bringing the workpiece and tool head into processing contact. Other types of tool heads may require some other approach, such as an offset axial approach, an approach along a curve, or a combination of radial and axial movement.

Typically, the workstation is on a radius of the central turret, which also passes through the planetary turret axis. The workstation is preferred to be either on the radially near side or the radially far side of the planetary turret axis, relative to the central turret axis. By way of analogy, each planetary turret may be viewed as carrying a clock face that orbits the central axis but does not rotate on the planetary turret axis. Thus, this clock face always has 6 o'clock position and 12 o'clock position located on the radius from the central turret axis, with 6 o'clock position nearer to the central axis and 12 o'clock position further from the central axis. The preferred positions of the workstation would be either at 6 o'clock or 12 o'clock. As the tool head stations cycle between stops, each one, in turn, would dwell at the workstation. Thus, as the planetary turret orbits the central axis, the tool head stations orbit the planetary axis; and a successive one of the tool head stations will dwell at the workstation—for example, at 6 o'clock position—at each stop.

Each planetary turret is associated with a workstation of the workpiece carrier. The planetary turret sequentially positions each of its carried tool heads at the associated workstation by the described cycle. Each tool performs its function upon the workpiece when the tool head is positioned at the workstation. All workstations are preferred to be at a single radius from the central turret axis so that the carrier can be an annular wheel, and the workstations all can be located at the intersection of the wheel with each planetary turret. During one revolution of the central turret, a workpiece is processed by the tool heads carried at each tool head station of a planetary turret. Suitable means for engaging the tool head with the workpiece, referred to above as process tooling, can move the tool, the workpiece, or both into mutual engagement by relative motion, as may be required to permit the tool to perform its work on the workpiece. For example, such process tooling may include push plates, rams, cam and follower mechanisms, compressed air, vacuum, hydraulics, pneumatics, or the like. After such processing, or after each step of multi-step processing, a disengaging means may cause additional relative motion between the workpiece and tool head, disengaging the workpiece and the active tool head. In particular, if during engagement the workpiece was moved from the article carrier, the disengagement should return the workpiece to the carrier. Further process tooling, such as the rams referred to above, may disengage the workpiece and tool head. To at least some degree, the required engaging or disengaging motion is expected to be linear and reciprocal. However, rotary motion or any other type of motion also is possible, such as if spin forming is being performed.

In one process cycle, a workpiece is processed by a plurality of individual steps while orbiting the central turret axis one time, or less. Similarly, each workpiece is processed by a plurality of individual steps while its associated planetary turret rotates one revolution or less. Still further, in a machine having a plurality of planetary turrets, a plurality of workpieces are processed simultaneously in the same machine, with each planetary turret processing one workpiece a plurality of times during a single revolution of the central turret.

The workpiece carrier may carry workpieces in a plurality of its workpiece stations. Each workpiece is carried in association with a different workstation. A typical article carrier is an annular pocket wheel that rotates about the central turret axis with the central turret and carries a plurality of equally spaced workpieces. Each workpiece is axially aligned with a workstation in such a manner that the tool head at the workstation and the workpiece can be brought into sufficient engagement for the tool head to perform its function or work on the workpiece.

Typically, the workpiece enters or is delivered to the workpiece carrier at a fixed entrance or inload point in the carrier's travel and is discharged or removed from the carrier at a fixed exit or discharge point, with the major arc between entrance and exit points being slightly less than one revolution about the main axis. Accordingly, the tool head station positions in the planetary turrets are preselected and the planetary turret's rotation is timed to process the workpiece within the arc between entrance and exit points of the workpiece carrier. The planetary turret typically will move through an even number of index cycles during one revolution of the machine about the central axis. The tool stations are best spaced symmetrically about the planetary turret, with one station being empty to accommodate that portion of rotation about the central axis between the exit and entrance points of the carrier. Thus, the architecture of the preferred machine will employ an odd number of active tool positions, plus one blank position, on each planetary turret.

Alternatively, the machine may be designed to carry the tools and the workpieces in reversed positions, and the scope of the invention should be taken to include such reversal, mutatis mutandis. Thus, each planetary turret may carry a plurality of the workpieces, and the annular workpiece carrier may, instead of carrying workpieces, carry tool heads.

A number of specific embodiments of the new machine are possible through use of conventional tool designs. For example, in the can making art, the planetary turrets may carry known tool heads for trimming, necking, or flanging a can body. Since a planetary turret can carry a plurality of tool heads, such as one at each tool head station, the tool heads and related process tooling can be selected as desired. A typical turret design might carry five tool heads and have one empty station. Thus, it would be possible to trim the can body with the first tool head, neck the can body at three successively smaller die-necking tool heads, and finally form the flange at the final tool head. The presently preferred embodiment employs die necking tools at all occupied tool head stations, enabling a single machine to perform five die-necking reductions on each can body. The machine has utility to perform these or other functions or combinations of functions, according to the specific design of the tool heads.

With reference to FIG. 1 of the drawings, a necking machine 10 is constructed with a central shaft 12 that is continuously driven. The centerline of shaft 12 is collinear with the central axis of the machine, and the shaft is centered for symmetrical rotation about this central axis. The shaft is carried by a stationary, chair-style base 14, which supports the shaft from only one end. This configuration of the base permits ready access to machine components from the unsupported end of the shaft, which is an aid to maintenance and repair. The main shaft is carried in a trunnion or elongated hub 16 supported from the base. Near its free end the shaft carries a first cam 18 that is mounted on bearings 20. A tie rod 22 connects the first cam to the base 14 and prevents the first cam 18 from rotating with the central shaft 12. The tie rod 22 is of the turnbuckle style with adjustable length for timing the cam. Although the first cam 18 does not rotate with the main shaft 12, the tie rod can be adjusted in length to alter the rotational position of the first cam with respect to the base.

A central turret 24 is fastened to or rotates with or upon main shaft 12. This central turret may be viewed as having two component sections or sub-turrets, which are the front turret plate 26 and the rear turret plate 28. On the front or tool side of the machine, the front turret plate 26 carries a plurality of planetary turrets 30, each mounted for rotation about or with a central planetary shaft. Various preselected article handling or processing tooling is carried on each planetary turret, as explained below. The front side of the planetary turrets faces cam 18 with cam followers 29 and ram 98, which provide the knock-out motion for rams 70 of the tooling. The planetary turrets 30 are symmetrically spaced around the main shaft 12 in at least one ring.

Figure 5:
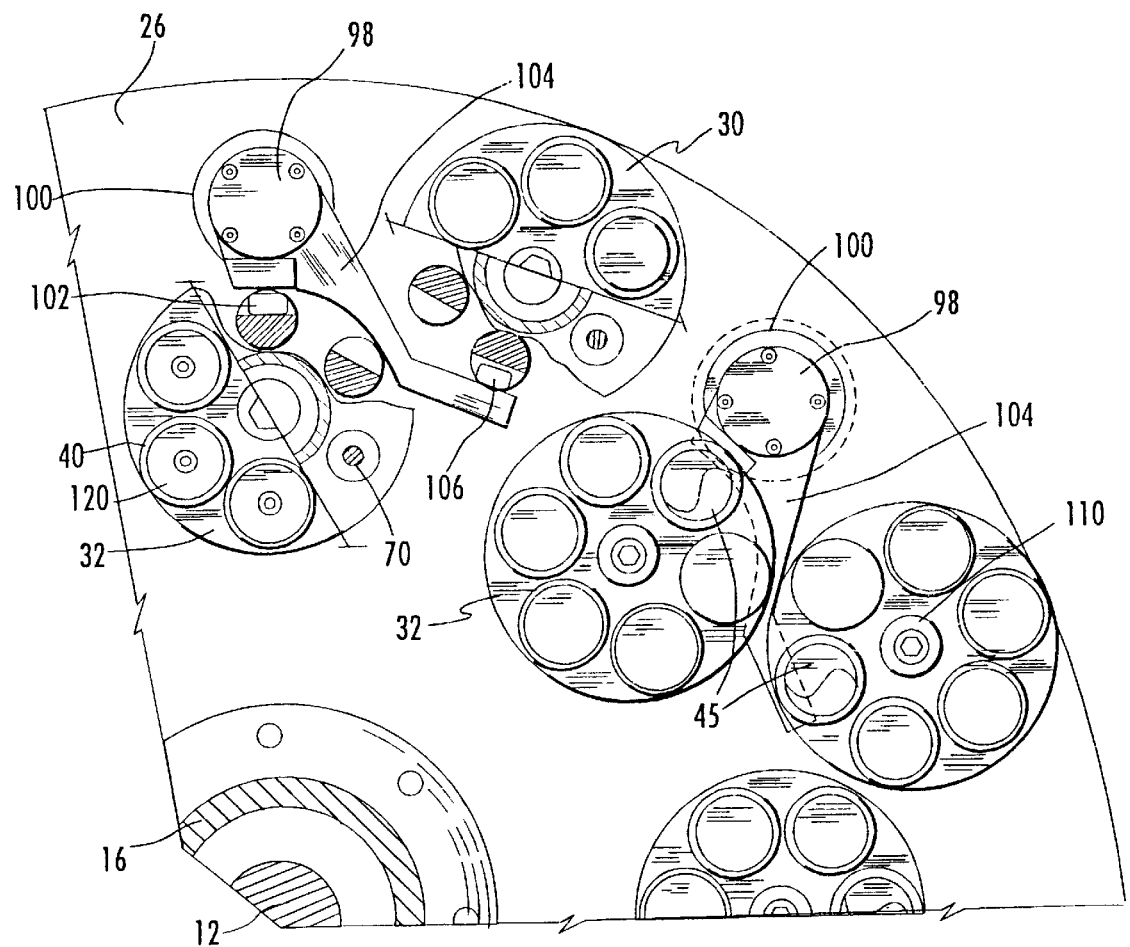
FIG. 5 is a transverse cross-sectional view taken along the plane 5—5 of FIG. 3, showing details of the tool turrets.

For greater can processing capacity, a second ring of planetary turrets 32 is nested with ring 30, as shown in FIGS. 1 and 5. Nesting between two rings of planetary turrets is achieved by positioning each turret of one ring near the interstice between two turrets of the other ring, allowing the rings to be radially closer together than would be possible or practical if the turrets of each ring were radially aligned. As a practical matter, nesting serves several functions. First, it permits the workstation position of the planetary turrets in both rings to lie centered along a single circle, at a single radius from the central axis. This positioning permits a single article carrier wheel to serve both rings of turrets. Second, nesting allows the machine to be more compact in size than would be possible without nesting. More than two rings of planetary turrets may be employed, whether nested or not, with suitable adaptations to the article carrier wheel to serve all workstations.

The rear turret plate 28 is spaced from the front plate and is mounted near the center of trunnion 16. Plate 28 carries a plurality of can pushing rams 34 mounted in linear bearing cartridges. In addition, the rear turret plate is connected to the workpiece carrier 36, which may be a conventional pocket wheel or another type of conveyor that supports can bodies during their passage through the machine. One can pocket is aligned with each can pushing ram 34, and the ram is operable to push to can body forward, into engagement with the tool head on the front side of the pocket.

A second cam 38 is mounted on the trunnion hub 16 near the rear side of the machine. The second cam 38 is stationary with respect to the base 14. Cam followers 39 on the rear end of rams 34 engage cam 38. The cam guides the rams 34 as they advance and retract during their operation, pushing the cans into the tool heads.

Figure 2:
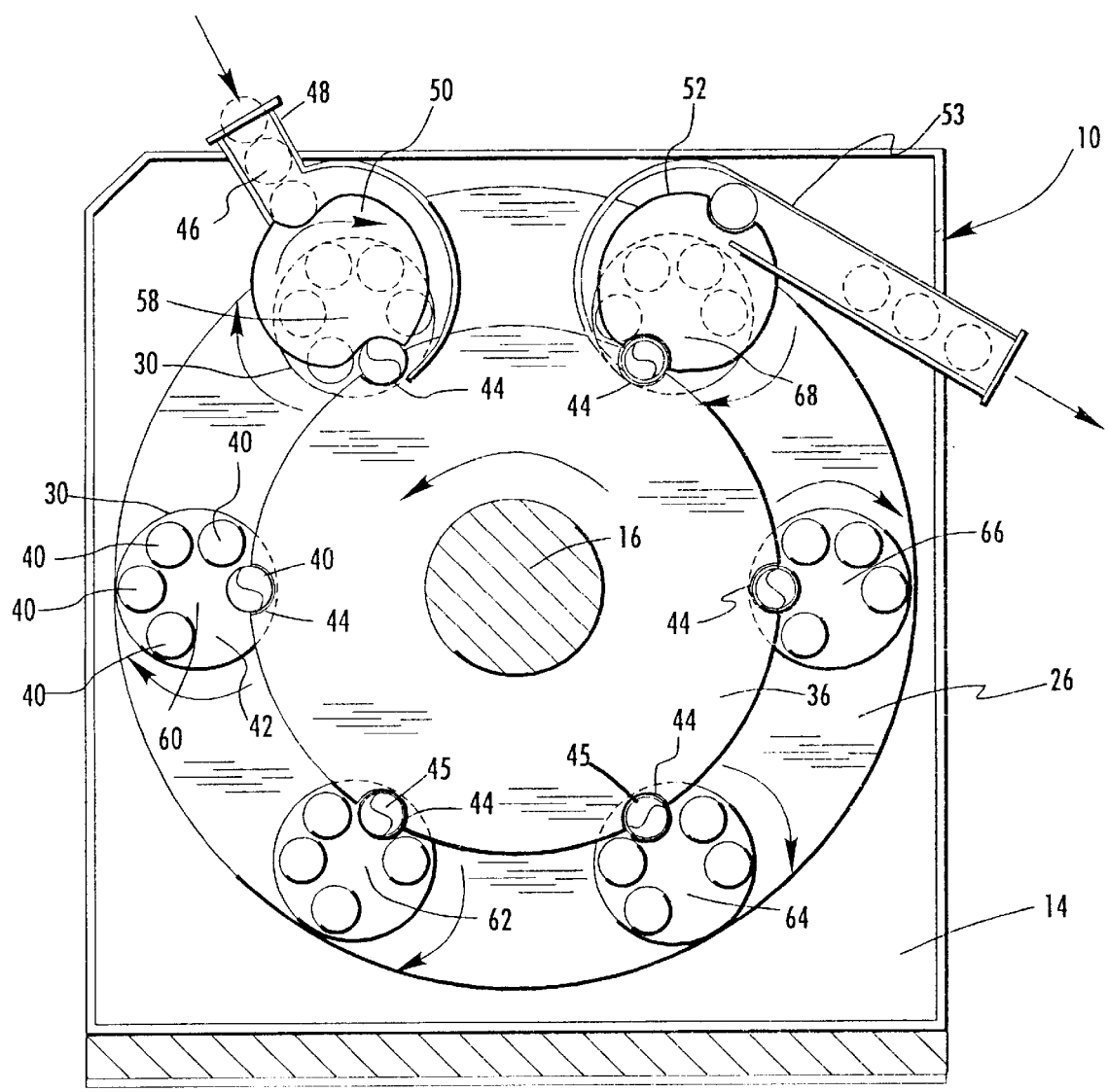
FIG. 2 is a schematic developmental view showing the progress of one planetary turret through one revolution of the main shaft, and is generally similar to a transverse cross-sectional view along the plane 2—2 of FIG. 1.

Illustrating the operation of a planetary tool turret, FIG. 2 shows a simplified, schematic view of a front turret plate 26 with one of the planetary turrets 30 shown paused at each of six possible index stops. At the same time, the planetary turret is shown paused at each of six sequential orbital positions about central axis 12. Each turret 30 is subdivided into six equidistant tool stations; with the number of tool stations equalling the number of index stops in one revolution about the planetary turret axis. During six successive stops, each tool station dwells in each of the six rotational positions. Five of the tool stations carry a tool head 40, which for purposes of example is selected as being a die necking tool head. FIGS. 2 and 5 show that the die necking tools 40 of each planetary turret are of different neck sizes. The tool heads are arranged on each turret for sequential arrival during processing of one can body in order of decreasing die size at the workstation position, which in FIG. 2 is at the point where a tool station overlaps a container pocket. The sixth tool station 42 is empty or blank but provides a useful reference point to illustrate the rotation of the planetary turret. The workpiece carrier 36 is defined by a plurality of container stations or other carrying devices 44, each of which receives and conveys a can body along an annular pathway that intersects or axially eclipses the dwell position of a tool station at the radially inner sector of the planetary turret 30. This intersection of the tool head station with a container pocket defines the position of the workstation 45 of each planetary turret.

Tubular workpieces such as can bodies 46 are fed into the machine by conventional can handling equipment. For example, an infeed chute 48 directs the can bodies 46 into pockets of an infeed wheel 50, which rotates clockwise in the view of FIG. 2, as indicated by the arrow near the wheel. The rotation of the infeed wheel 50 is synchronized with the rotation of the container pockets 44, which rotate counterclockwise on shaft 12 in FIG. 2, so that each pocket 44 receives a can from the infeed wheel. One pocket 44 is associated with each planetary turret and is positioned to carry a can at the respective workstation of the associated planetary turret. The front turret wheel, with its carried planetary turrets, rotates with the annular ring of container carriers 44. Thus, a can body is fed into a pocket 44 that maintains the can at a workstation 45 of a single planetary turret throughout the can's travel through the machine 10. At the completion of processing, the can carrier 44 brings the can body to an outfeed wheel 52, which discharges the can from the machine 10 through an outfeed chute 53.

The mechanisms that synchronize the infeed and outfeed wheels with the rotation of the carrier pockets 44 are shown in FIG. 1. Near the right side of FIG. 1, bull gear 54 is carried for rotation with shaft 12. The rotating bull gear 54 drives the infeed wheel 50 and outfeed wheel 52 through pinion gears 55. The infeed and outfeed wheels each are connected to one of the pinion gears 55 through a shaft carried by a bearing cartridge 56, which is mounted to base 14. Thus, the infeed and outfeed wheels are synchronized with the positions of the can carrier pockets 44.

A single can body is processed by each tool head on the planetary turret of FIG. 2, as the turret dwells at each index stop. This figure also shows the sequential positions of a single can body as it is processed by the single planetary turret while being conveyed through one revolution of the central turret 24. The six successive index stops of the turret in FIG. 2 are numbered 58, 60, 62, 64, 66, and 68, in sequential order for processing the single can body. It should be understood that, although FIG. 2 shows six static positions, the central turret rotates continuously, carrying with it the container pockets. The planetary turrets orbit continuously with the central turret. At the same time, they index and dwell six times to assume the six illustrated positions, which are static index stops when considered from the perspective of the container carrier pocket 44.

The can body is in alignment with one tool head station of planetary turret 30 at each illustrated index stop 58–68. When turret 30 is in the position of index stop 58, the can is delivered into a carrier pocket 44. The aligned tool station of the turret carries no tool head and, thus, is the empty station 42. As the planetary turret moves with the counterclockwise rotation of the central turret, the planetary turret rotates clockwise on its own axis, bringing a first tool head 40 into alignment with the can. A ram 34 that is aligned with the can pushes the can forward into the first tool head 40 as the can orbits shaft 12, counterclockwise with the workpiece carrier. The can is necked-in by a first increment through contact with a conventional necking die in tool head 40. A knock-out ram 70 in the tool head pushes the can body rearwardly, out of the die and back into its initial position in the carrier pocket. This first stage indexing and necking takes place over about 60° of arc centered on the central shaft 12, starting with the infeed point at index stop 58 and ending at the second illustrated index stop 60. At position 60, the can is resting in the carrier pocket 44 and the cycle can be repeated.

Between the next successive index stop positions 60 and 62, the planetary turret is indexed to bring a second tool head 40 to the workstation position 45. A ram 34 pushes the can into the necking die of the second tool head, and the knockout punch returns the double-necked can to the workpiece carrier. The cycle is repeated until the planetary turret reaches index stop 68 at the outfeed chute. Between positions 68 and 58, the planetary turret 30 rotates to its next index position, bringing the blank sector into alignment with the pocket in preparation to receive a new can body.

In FIGS. 2 and 5, the five tool heads 40 are shown in sequential order by size of necking die. For example, in FIG. 2 at position 60, the necking die at the workstation has the largest die opening, while at position 68 is has the smallest opening. FIG. 5 shows the relative ordering of the five dies on a single planetary turret.

Although FIG. 2 shows planetary turrets 30 in positions only on the radially outer side of the carrier pocket pathway, the preferred machine has a second group or ring of planetary turrets 32 on the radially inner side of the carrier pocket pathway, as better shown in FIG. 5. The turrets 32 of the inner ring are nested between the circumferential locations of the outer turrets 30. The inner turrets have a workstation at their radially outer point, i.e., at 12 o'clock position, rather than at the radially inner position as shown for the first group of planetary turrets 30.

Figure 3:
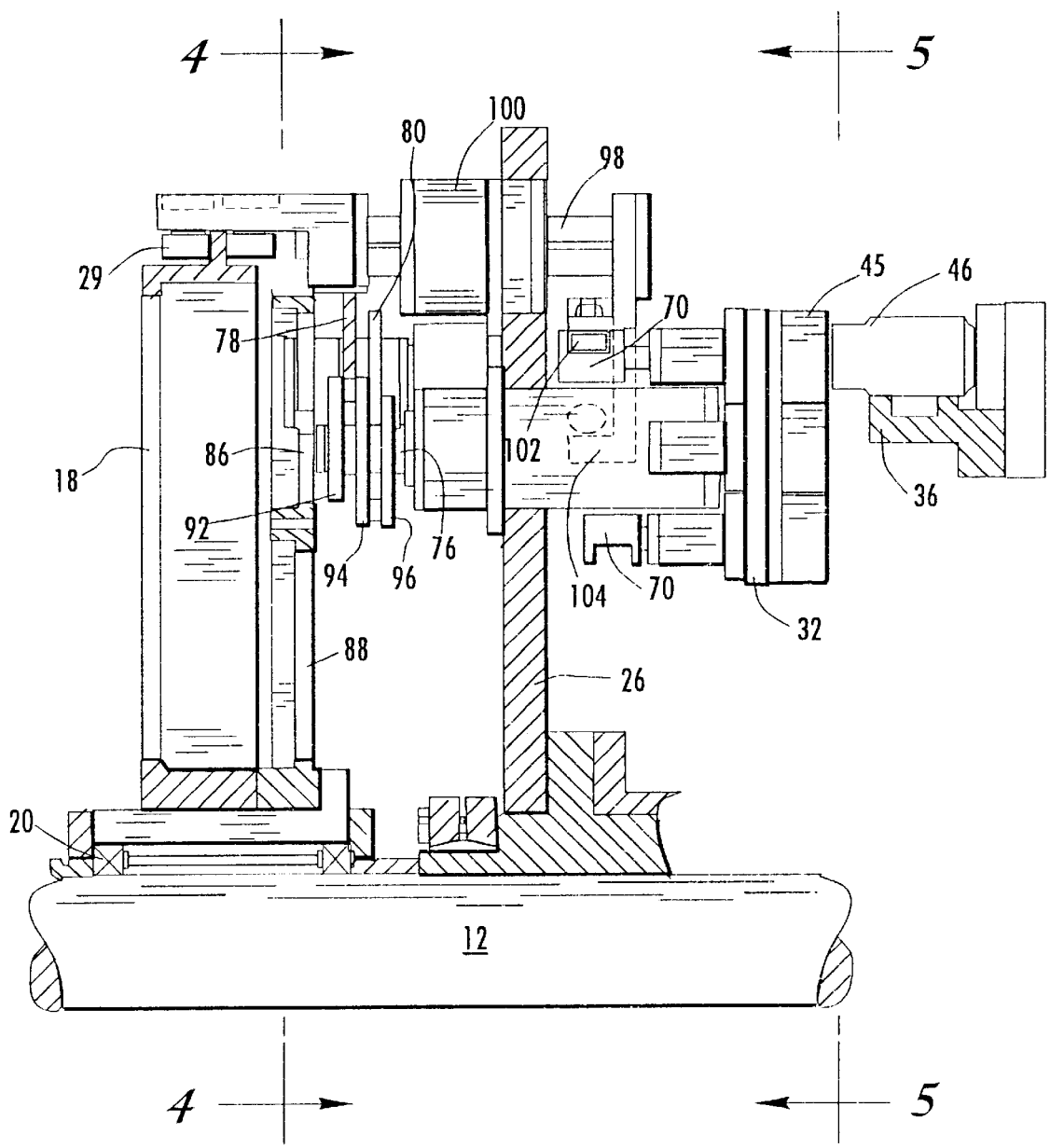
FIG. 3 is an enlarged, partial side elevational view in partial cross-section, showing details of the top left hand portion of FIG. 1.
Figure 4:
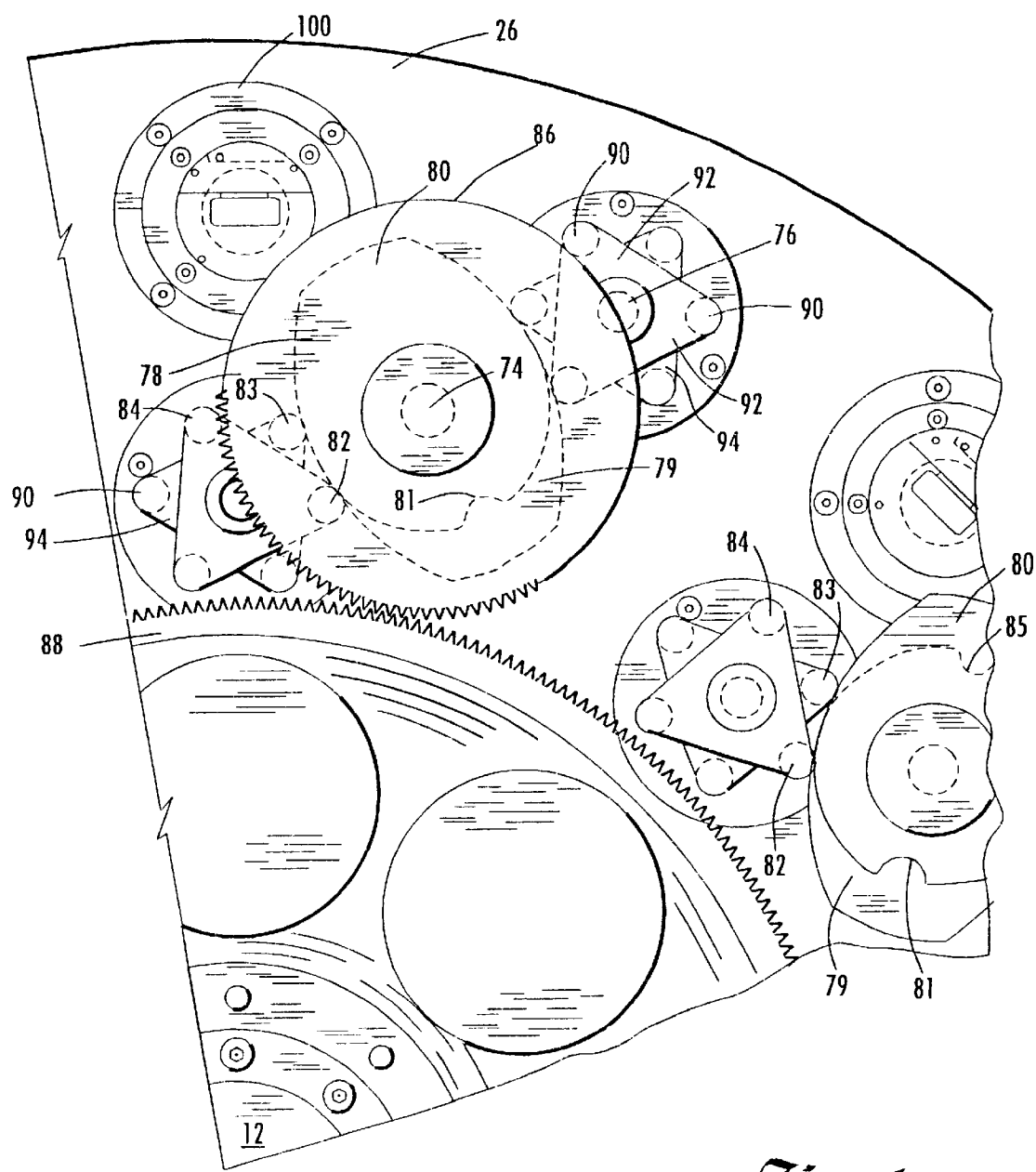
FIG. 4 is a transverse cross-sectional view taken along the plane 4—4 of FIG. 3, showing details of the index drive mechanism.

FIGS. 3 and 4 illustrate details of the index drive mechanism 72 that moves the planetary turrets through repeated index cycles to bring each tool head to the workstation and then dwell the tool head at the workstation for a sufficient time for the tool to process the workpiece. The index drive operates on an input shaft 74 and an output shaft 76. The input shaft 74 is supported on bearings for rotation. It may be mounted in a housing box or cartridge mounted to the front turret plate 26. The input shaft 74 carries a conjugate pair of contoured, lobed, plate cams 78, 79, which respectively will be referred to as the front and back cams. These cams together will be referred to as the cam assembly. The cams are parallel and mutually spaced apart on shaft 74 in order to receive between them a center plate of the follower roller assembly, as described below. The cams are of identical shape but are phased with respect to each other at 180° within the cam assembly. The preferred shape of each cam is illustrated by the front cam 78, which defines a protruding lobe 80 at one end, while the other end defines a recess 81 sized to closely engage a cam follower roller. The input shaft 74, which drives the cam assembly, is driven by a suitable means, such as pinion gear 86 carried on the front end of shaft 74 for rotation with the input shaft. A bull gear 88 is carried on the machine's main shaft 12, centered on the machine's central axis, in a stationary position with respect to base 14. For example, the bull gear is mounted to the same hub as the knock-out cam 18 and rides on bearings 20 as the central shaft 12 turns. The teeth of pinion gear 86 engage the teeth of the bull gear, and the pinion gear is driven as it orbits the bull gear with the rotation of the central turret.

The index drive output shaft 76 provides output motion to a planetary turret. This shaft 76 is supported on bearings for rotation and may be mounted either in a cartridge carried in the front main turret plate 26 or in a housing box. The output shaft is connected to the central shaft of a planetary turret, either in a collinear position with shaft axes aligned or with shafts offset. Shaft 76 may be unitary with the central shaft of a planetary turret, directly carrying the planetary turret Within the index drive, the front end of shaft 76 carries a cam follower assembly consisting of two stacked arrays of cam follower rollers 90. Each array is planar and is carried between two carrier plates. The arrays may share a common intermediate plate, thus requiring a total of only three carrier plates. Each array is coplanar with a different one of the plate cams. The arrays will be referred to as the front and back arrays, corresponding to the respective front or back plate cam that acts upon the array. Each array of rollers is a set of three, located at equal 120° intervals along a pitch circle centered on the output shaft 76.

Within an array, the rollers are spaced from each other, providing a gap between each pair of rollers for receiving a plate cam lobe during index motion. The two arrays or sets of rollers are phased at 60° with respect to each other. Thus, as shown by the rollers 90 of FIG. 4, output shaft 76 carries rollers at a net 60° interval, with the position of each sequential roller about the circumference of the pitch circle alternating between the front and back arrays. A front carrier plate 92 and a center carrier plate 94 carry between them the first or front array of three rollers. The plates 92 and 94 are spaced sufficiently to receive between them the cam lobe 80 of front cam 78. The center plate 94 and a rear plate 96 carry between them the second or back array of three rollers. The spacing between plates 94 and 96 is sufficient to receive the lobe of the back cam 79. The carrier plates are fixed to the output shaft, with the result that the rollers are carried in fixed positions with respect to the shaft. The front cam 78 engages the front array of follower rollers, while the back cam 79 engages the back array of follower rollers.

At least one follower roller of each array, for a total of at least two rollers, always engages the plate cam assembly. These rollers will be referred to as the contact rollers, and during any dwell period one of these contact rollers is supplied from each of the front and back array. In dwell position as shown in FIG. 4, the follower roller assembly and, hence, the output shaft is held firmly against movement by contact between the two cams and the two contact rollers, which are phased by 60°. The front and back cams and the corresponding front and back contact rollers are arranged such that during dwell, the contact roller associated with each cam is in a relatively distal position from the cam lobe. Thus, in the view of FIG. 4, the front cam has its lobe pointing generally upwardly and the cam is rotating counterclockwise. Correspondingly, the front follower array has its contact roller in a leading position for clockwise motion, while the back array has its contact roller in a trailing position. The terms, "leading" and "trailing" are relative to the direction of motion of the two contact rollers, in this case indicating that the leading roller is most advanced and the trailing roller is least advanced in the clockwise direction.

As the dwell period is completed and index motion begins, the cams rotate the output shaft by advancing the contact rollers. As many as three rollers of an array assembly will contact the cam assembly during index movement. As the index motion takes place, the front cam lobe approaches the front, leading contact roller 82 by first passing over the back, trailing contact roller 83. The front cam lobe enters the gap between the spaced rollers of the front array, which in FIG. 4 is the gap between the front, leading contact roller 82 and the next counterclockwise roller 84 of the front array. The cam lobe 80 engages the front contact roller 82 and advances the front contact roller 82 clockwise by a fraction of a circle. While in the gap between rollers 82, 84 of the front array, the front cam lobe 80 may contact both of the front rollers 82, 84 defining the gap. At the same time, the back cam 79 is presenting recess 85 to the back, trailing contact roller 83. The interaction of the recess 85 with the trailing contact roller 83 also assists in advancing the output shaft.

At the completion of the index movement, the original trailing contact roller 83 of the back array will exit recess 85 in a 60° advanced position. The back contact roller 83 will have advanced to the leading position. However, the original front, leading contact roller 82 will have advanced 60° and will not be in a contact roller position. Instead, the next counterclockwise roller 84 of the front array, which is phased 120° counterclockwise from the original front contact roller 82, will become the new front contact roller and will be in trailing position.

After a dwell period, the index movement repeats with the back cam 79 next advancing its lobe into the gap in the back array to advance the output shaft. Thus, during successive periods of index movement, the plate cams produce positive alternating driving action between the two arrays of follower rollers, producing positive intermittent motion in the output shaft 76. With each index movement, the cam lobe of one plate cam drives one follower roller in leading position for rotation through a partial circle, such as through an arc of 60°. During interaction between one cam lobe and the roller in leading position, the other index cam presents a recess 81, 85 that receives the trailing roller of the other array, allowing the two arrays and output shaft to rotate. When the cam lobe has advanced the roller from leading position, the output shaft enters a period of dwell as the central turret rotates through an arc of, for example, 30°.

A single pair of plate cams operates two output shafts 76 and, hence, two planetary turrets. The two output shafts are diametrically opposed, on opposite sides of the shared input shaft. As best shown in FIG. 4, the plate cams 78, 79 operate one planetary turret of the outer ring and a second, nested, juxtaposed planetary turret of the inner ring. Such double duty by the plate cam assembly save space and cost in the machine 10.

The components of the index drive can be arranged and mounted in several configurations, in which one input shaft operates one or more output shafts. In a first example, a commercially available index drive assembly, which is in a modular box, can be attached to the front turret, and the output shaft can drive a single planetary turret. The number of such boxes would equal the number of planetary turrets. In a second example, which is a variation of the first arrangement, the input and output shafts each can be mounted in bearing cartridges and independently installed in the front turret. The output shaft still drives or is in common with the central shaft of a planetary turret. This second example would reduce the mass carried by the front turret, but it would add complexity to adjusting clearances between the cams and follower rollers. In a third example, which is similar to the embodiment described in detail above, a modular index drive consisting of a single input shaft and two output shafts is carried in a box mounted to the central turret and will drive two planetary turrets from a single input shaft. This third example is preferred in order to simplify setting clearances between the internal components of the index drive. The output shafts may be coupled to the planetary turret shafts by variable offset couplings, such as Oldham couplings. In a fourth example, a master plate cam assembly could be mounted on the central shaft 12 of the machine 10 and rotated in an opposite direction to the front turret plate 26 at a suitable speed to operate all of the output shafts of an entire single ring of planetary turrets. In each described arrangement and still others that might be devised, the number of index cams, the number of lobes on each index cam, the number of arrays of follower rollers, and the number of rollers in each array on the output shaft can be suitably selected to cause the desired index motion in the planetary turrets. The described contours of the cams and followers is merely a preferred embodiment. Other cam and follower designs are adaptable to variations in the machine. U.S. Pat. No. 3,572,173 provides further details and discussion or index drive mechanisms and is incorporated by reference herein for such teachings.

Figure 6:
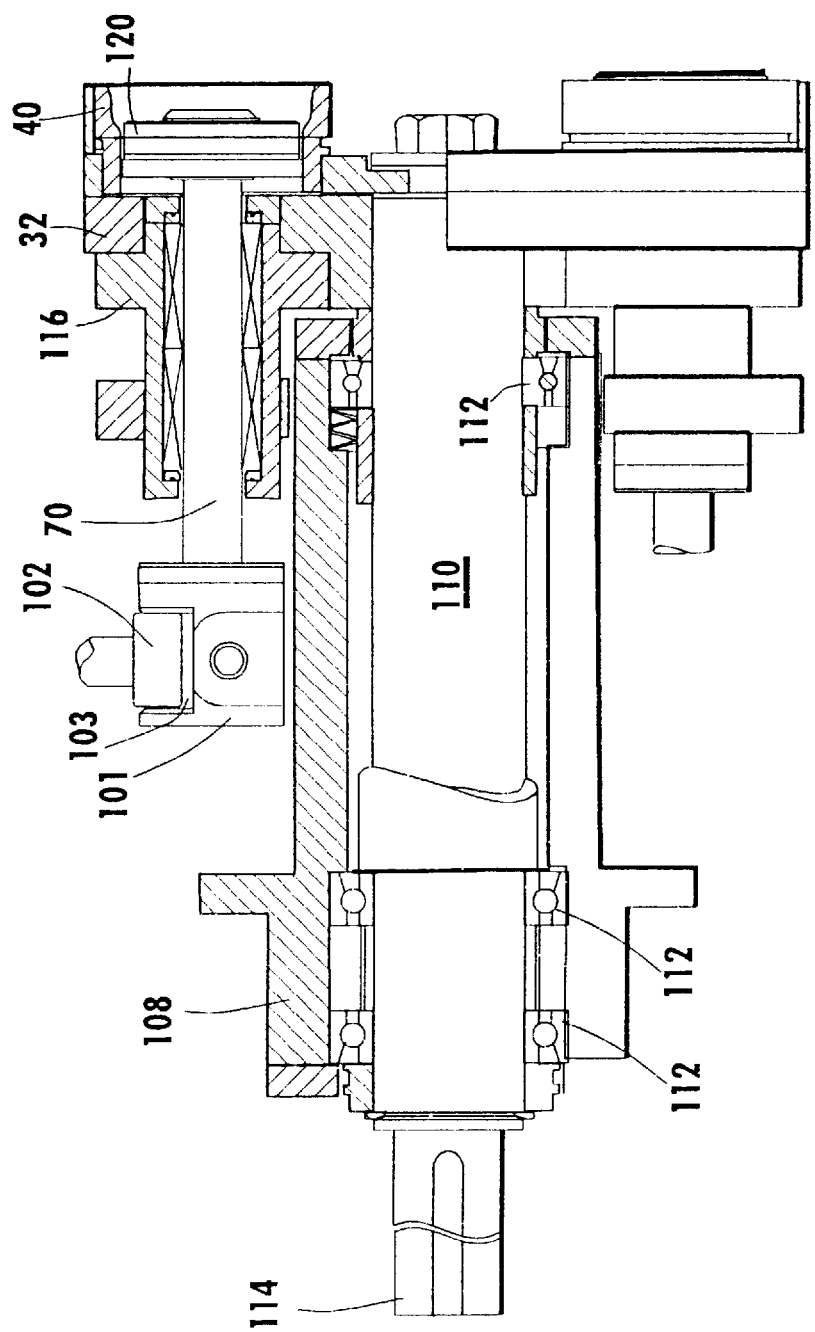
FIG. 6 is a longitudinal cross-sectional view taken through a planetary turret, showing details of the turret structure and a typical tool head.

FIGS. 3, 5 and 6 show the preferred structure of the inner and outer rings of planetary turrets 30 and 32. The turrets are nested, which allows the turrets of both rings to position a tool head at one of the workstations 45. All of the workstations 45 are at a single radius from central shaft 12, as established by the position of the workpiece carrier pockets 44. Thus, the outer ring of turrets 30 is on the outer side of the pockets 44, while the inner ring of turrets 32 is on the inner side of the pockets 44. The knock-out ram 70 of each tool head at the workstations is operated from the cam 18. A pair of knock-out rams 70, consisting of one on an inner ring turret 32 and one on an outer ring turret 30, is operated by a single set of cam follower rollers 29 and a single longitudinal actuation arm 98. FIG. 3 best shows the cam follower rollers 29 that engage the double-acting cam 18. The rollers 29 are carried on the front end of an actuation arm 98, which is carried in a bearing cartridge 100, FIG. 5, mounted in the front turret plate 26. The cartridge 100 is positioned in plate 26 between two turrets of the outer ring, which places the arm 98 radially near the workstation of an inner ring turret 32. On the planetary turrets, each knock-out ram 70 is provided with a head 101 that engages arm 98 when the ram 70 is at the workstation. The head is configured with a channel or slot 103 that extends transversely to the ram. Arm 98 carries a roller 102 that is engaged in slot 103 when the planetary turret rotates the respective head 101 to the workstation. The slot 103 permits each knock-out ram to disengage from roller 102 as the planetary turret continues its rotation, bringing a next knock-out ram with a new head 101 to the workstation.

In addition, with reference to FIG. 5, the arm 98 is connected to an extension arm 104 that passes circumferentially and radially inwardly between juxtaposed inner and outer turrets. The free end of the extension arm carries a roller 106 that engages the knock-out ram of an outer ring workstation, in a slot 103 on the knock-out ram head.

FIG. 6 shows additional details of a preferred planetary turret and tool heads, for example of an inner ring turret 32. The planetary turret is mounted to the front plate 26 in a bearing cartridge 108, which supports a central planetary turret shaft 110 in suitable bearings 112. The shaft 110 is configured at its end 114 to engage or be coupled to the output shaft of an index drive mechanism. The planetary turret 32 carries tool heads, such as necking die tool heads 40. Each of the tool heads includes a bearing cartridge 116 that carries the knock-out ram 70 in suitable bearings 118 for linear motion. The end of the shaft in the die ring 40 is provided with a punch 120 of a suitable size to push a processed can body free of the die ring 40.

According to the preferred method of this invention, a tubular workpiece such as a can body 46 is sequentially processed by a plurality of tool heads 40 as the workpiece travels through no more than one revolution about a central axis, such as the axis of central shaft 12. The workpiece is moved along an annular workpiece pathway, such as the pathway defined by workpiece stations 44 of workpiece carrier 36, as it rotates about the central axis of shaft 12. At the same time, a plurality of tool heads 40 are arranged along an annular tool head pathway, such as the pathway defined by the tool head stations of each planetary turret 30, 32, as they rotate about the planetary axis of shaft 110. The workpiece pathway and the tool head pathway lie in parallel planes, which are offset sufficiently to create an overlap between the paths of the workpieces and the tool heads. The tool head pathway is in a planetary position with respect to the central axis of the workpiece pathway. Thus, the axis of shaft 110 is offset from the axis of shaft 12. With the axes offset, it is possible for one axis, or the annular pathway centered on such axis, to orbit the other, which constitutes a planetary relationship between the tool head pathway and the central axis of the workpiece pathway.

Further, the method requires that the tool head pathway and workpiece pathway are relatively positioned to place a tool head in processing relationship to a workpiece. Each tool head must dwell at a common predetermined point, such as at a workstation 45, where the tool head can process a workpiece. At the workstation 45, the aligned tool head and workpiece are in sufficient proximity to each other that the workpiece and a tool head eclipse each other, when viewed in the longitudinal direction of the central axis. The overlap provides at least one location in which a tool head 40 is aligned with or in proximity to a can body 46 in a station 44 of the workpiece carrier 36. It is generally desired that the can body and tool head be axially aligned when the end of the can body will enter the tool head for die necking. However, other types of tool heads may not require axial alignment in order to perform their functions, and for this reason the degree of alignment or overlap should be broadly interpreted to reflect the needs of the particular tool head to perform its work. The overlap may be from the inner side or outer side of the workpiece pathway. The two paths may overlap at a single location or at two locations, depending upon the degree of overlap.

The tool head pathway is orbited around the central axis of the workpiece pathway. This orbital motion follows a workpiece station on the workpiece carrier and is at the same rate and in the same direction as the rotational motion of the workpiece around the central axis. Thus, the workpiece remains in processing relationship with a single planetary turret over its entire travel through a substantial arc around the central axis of machine 10 in workpiece carrier 36. The planetary turret continues to overlap the empty workpiece carrier station 44 through the minor arc between the outfeed point of a processed workpiece and the infeed point of a new workpiece.

As the planetary turret orbits the central axis, it also moves intermittently on its own planetary turret axis, such as on shaft 76 or planetary shaft 110. The planetary turret revolves through index cycles, which provide a repeated alternating periods index motion and dwell. Each revolution of the planetary turret is subdivided into a plurality of such cycles. The number of cycles corresponds to the number of tool heads and empty tool head stations on the planetary turret. Each tool head is placed in proximate position to the workpiece during one of the dwell periods, at which point the active tool head is at the workstation 45. It is not necessary to position a tool head over the workpiece station 44 between the outfeed and infeed points of the workpiece carrier, so the final cycle may position a blank tool head station in proximity to the empty station 44. For convenience of description, the series of indexed cycles may be viewed as starting when a new can body is fed into the workpiece carrier at the infeed point and finishing when the processed can body is removed at the outfeed point.

During each dwell period when a tool head and workpiece are in processing relationship, the workpiece and tool head may be engaged, allowing the tool head to process the workpiece. The exact nature of the engagement depends upon the requirements of the tool head. As noted previously, it may be necessary to move the tool head and workpiece into physical engagement along a common axis, such as when using a symmetrical tool, i.e., a necking die. Other types of tool heads may require a nonsymmetrical engagement or none at all. In either event, when the tool head has processed the workpiece, the workpiece and tool head are disengaged, as necessary. Engagement and disengagement may be aided by process tooling that is ancillary to the selected tool head and may include pushing rams 34 and knock-out rams 70. At the completion of one revolution of the article carrier and one revolution of one planetary turret, one workpiece has entered the workpiece carrier, has been processed by every tool head on the one planetary turret, and has been removed from the workpiece carrier.

In the method of operation of the illustrated, preferred embodiment, the necking machine 10 receives can bodies through conventional infeed apparatus and into pockets 44 of a continuously rotating workpiece carrier 36. The carrier is equipped with sixteen workpiece stations spaced equidistantly about its circumference. Each station is on a suitable radius to align a carried can body at a workstation position 45 with a tool head station of a different planetary turret 30 or 32 at an index stop. Each planetary turret carries five necking die tools 40, located at five of six equidistantly spaced tool head stations. As the workpiece carrier moves the can body through the machine, a ram 34 pushes the can body into one of the necking die tools 40, and a knock-out ram 70 in the tool head pushes the can body back into the workpiece carrier 36, in a cycle carried out a total of five times. At the completion of the can's cycle through the machine, an exit chute directs the can out of the workpiece carrier.

The planetary turrets 30, 32 are operated by an index drive mechanism 72. Each planetary turret is partially rotated six times during one revolution about central shaft 12. Each partial rotation is one-sixth of a revolution, such that each tool head station of the planetary turret is placed at the workstation during approximately 60° of central shaft revolution. The five necking die tools are presented at the workstation 45 in the order of their die size, from largest to smallest, so that the can body 46 is necked-in five times during its travel through a substantial portion of one revolution of the machine. The sixth tool head station 42 of each planetary turret contains no tool head, since this station is presented to the workstation between the exit and entrance can chutes.

The can pushing rams 34, the knock-out rams 70, and the planetary turrets 30, 32 are synchronized in their movements. Both rams operate at a tool head station positioned at a workstation 45, while the planetary turret is dwelling with respect to the workpiece carrier 36. The index drive operates without substantial play or backlash. It is gear driven from a stationary bull gear 88 that can be timed to achieve precise positioning. The result is that a single processing machine, occupying substantially less space than a cluster machine, is able to neck-in a beverage can five times. This produces a significant improvement in the cost of making beverage cans, both in the cost of machinery and in the cost of can line floor space. In addition, the modular nature of the machine, with its cartridge mounted components, is an improvement in machine design and allows simplified maintenance and component replacement.

Figure 7:
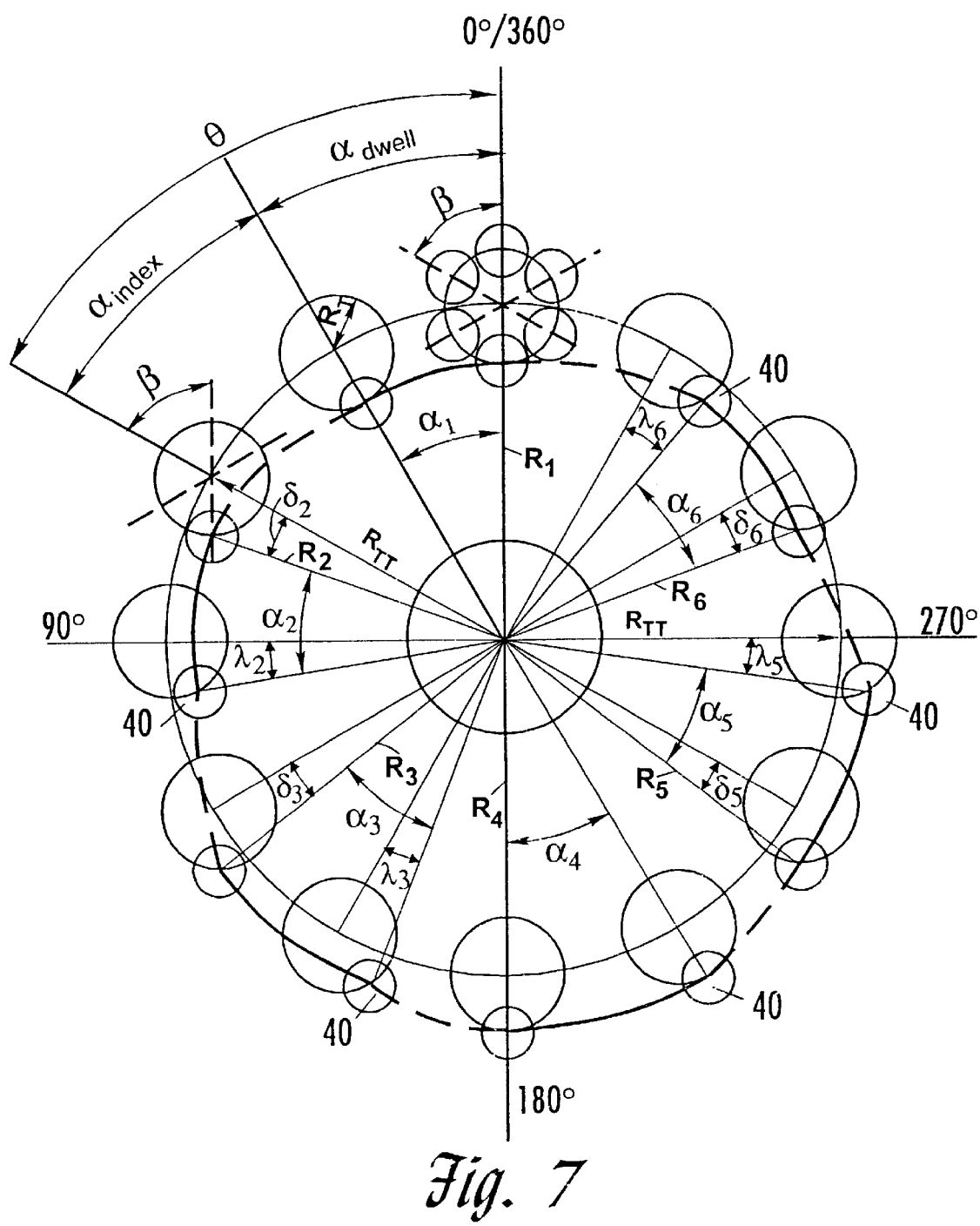
FIG. 7 is a schematic view showing the path of one tool head station in progression around the central axis of the machine.

A novel aspect of the machine is the orbital tool head pathway followed by each tool head or tool head station. FIG. 7 shows a schematic view of the path followed by a single station 40 during one revolution about central axis 12. The contour of the path is a function of a series of variables, which are shown in the figure or defined below:

$\Theta$=index cycle (degrees)=$\alpha_{index}+\alpha_{dwell}$ $\alpha_{index}$=index period (degrees)

$\alpha_{dwell}$=dwell period (degrees)

N=number of index stops in one revolution of the planetary axis.

n=number of tool stations on planetary turret.

$\beta$=index angle (degrees) between tool stations on planetary turret.

$R_{TT}$=radius from central turret axis to planetary axis.

$R_T$=radius from planetary axis to tool head axis.

$R_1 \ldots R_n$=respective radius between the central turret axis and the axis of a tool head measured consecutively in each of dwell periods $\alpha_1-\alpha_n$, i.e., at each of N consecutive index stops.

$\alpha_1-\alpha_n$=sector (degrees) around the central axis traced by the tool head path during each consecutive dwell period, as the preselected tool head dwells at each of N stops.

$\delta_1-\delta_n$=trailing out-of-phase angle of each sector $\alpha_n$, measured between radii $R_n$ and $R_{TT}$ at the trailing edge of $\alpha_n$.

$\lambda_1-\lambda_n$=leading out-of-phase angle of each sector $\alpha_n$, measured between radii $R_n$ and $R_{TT}$ at the leading edge of $\alpha_n$.

With further reference to FIG. 7, the path of each tool head on a planetary turret, while the planetary turret is at an index stop N, can be described as a sector $\alpha_n$ of a circle centered on the central axis of the main turret and having a radius $R_n$, which varies between each juxtaposed stop N. The sectors showing the tool head path at the stops are drawn in solid lines. Between these sectors, the path of the tool head is a curve of constantly changing radius, shown in dashed lines. For N=n=6, the values of $R_1 \ldots R_n$ are:

$$R_1 = R_{TT} - R_T$$

$$R_2 = R_6 = \sqrt{R_T^2 + R_{TT}^2 - 2R_{TT}R_T\cos\beta}$$

$$R_3 = R_5 = \sqrt{R_T^2 + R_{TT}^2 + 2R_{TT}R_T\cos\beta}$$

$$R_4 = R_{TT} + R_T$$

The trailing end of each sector n is at position $\Theta(n-1)+\delta_n$ degrees, starting at 0°. The leading end of each sector n is at position $\Theta n-\alpha_{index}+\lambda_n$, or when $\alpha_{index}=\alpha_{dwell}=0.5\times\Theta$, then leading end position=$\Theta(n-0.5)+\lambda_n$ degrees; and for $\Theta=60°$:

$\delta_1 = \delta_4 = \lambda_1 = \lambda_4 = 0°$

In absolute value, $$\delta_2 = \delta_6 = \lambda_2 = \lambda_6 = \arctan \frac{R_T \sin\beta}{(R_{TT} - R_T \cos\beta)} \text{ degrees,}$$

and $$\delta_3 = \delta_5 = \lambda_3 = 80_5 = \arctan \frac{R_T \sin\beta}{(R_{TT} + R_T \cos\beta)} \text{ degrees.}$$

Accordingly, the complex path of a single tool head can be traced, arbitrarily choosing a planetary turret initially located at 0° (12 o'clock) relative to the main turret as viewed in FIG. 7 and choosing a tool head at the radially closest position to the central axis of the main turret—at 6 o'clock position on the planetary turret. In FIG. 7, the main turret rotates counterclockwise on its axis, each planetary turret orbits the main axis in counterclockwise, stationary orbital position, while each planetary turret rotates clockwise on its own planetary axis. The chosen tool head initially moves through a dwell angle $\alpha_1 = \alpha_{dwell}$ at constant radius $R_1$. Second, the tool head moves through an index angle $\alpha_{index} + \delta_2$, while the radius expands from $R_1$ to $R_2$. Third, the tool head moves through a dwell angle $\alpha_2 = \alpha_{dwell}$ at constant radius $R_2$. Fourth, the tool head moves through an index angle $\alpha_{index} + \delta_3 - \lambda_2$ while the radius expands from $R_2$ to $R_3$. Fifth, the tool head moves through a dwell angle $\alpha_3 = \alpha_{dwell}$ at constant radius $R_3$. Sixth, the tool head moves through an index angle $\alpha_{index} - \lambda_3$ while the radius expands from $R_3$ to $R_4$. At this point, the chosen planetary turret is positioned at 180° (6 o'clock) relative to the main turret and the chosen tool head is positioned at 6 o'clock relative to the planetary turret in the view of FIG. 7. The radius R remained constant within each dwell period but increased from $R_1$ to $R_4$. Thus, generalizing, from $\alpha_1$ to $\alpha_m$ the radius increased from $R_1$ to $R_m$, and the radius further increased to $R_{m+1}$ at the conclusion of the third index cycle.

The tool head continues its travel by a seventh movement, through a dwell angle $\alpha_4 = \alpha_{dwell}$ at constant radius $R_4$. Eighth, the tool head moves through an index angle $\alpha_{index} - \delta_5$, while the radius contracts from $R_4$ to $R_5$. Ninth, the tool head moves through a dwell angle $\alpha_5 = \alpha_{dwell}$ at constant radius $R_5$. Tenth, the tool head moves through an index angle $\alpha_{index} - \delta_6 + \lambda_5$ while the radius contracts from $R_5$ to $R_6$. Eleventh, the tool head moves through a dwell angle $\alpha_6 = \alpha_{dwell}$ at constant radius $R_6$. Twelfth, the tool head moves through an index angle $\alpha_{index} + \delta_6$ while the radius contracts from $R_6$ to $R_1$. At this point, the chosen planetary turret is positioned at 360°=0° relative to the main turret, which is the starting point. During this second half of a revolution about the central turret axis, the radii of the successive dwell sectors decreased from $R_4$ to $R_6$ and further decreased to $R_1$ at the conclusion of the final index cycle.

As can be seen from the drawing of this path, each tool head follows a path that approximates a slightly irregular circle having its center offset by approximately the distance $R_T$ from the central axis of the main turret. The tool head path or tool station path of each of the tool heads or tool head stations have centers similarly offset in an array about the central axis of the main turret. These slightly irregular circular paths provide efficiency of motion while enabling each tool head to process the workpiece carried with the main turret.

As the tool head moves through the dwell sectors $\alpha_1 - \alpha_n$, these sectors are angularly offset or out-of-phase as a consequence of the trailing and leading angles $\delta_1 - \delta_n$ and $\lambda_1 - \lambda_n$. At $\alpha_1$ and $\alpha_4$ the value of $\delta_1 = \delta_4 = \lambda_1 = \lambda_4 = 0°$, as noted, above°. During the initial half circle or arc from 0°–180° starting with $\alpha_1$ and moving counterclockwise in FIG. 7, the out-of-phase angles having value other than zero can be viewed as positive, since the angles $\alpha$ are offset counterclockwise. During the second half circle or arc from 180°–360° starting with $\alpha_4$, the out-of-phase angles having a value other than zero can be viewed as being negative, since the angles $\alpha$ are offset clockwise. Generalizing, as the planetary turret moves through n dwell cycles consisting of dwell sectors $\alpha_x$ where x ranges from 1 to n, each sector is offset by a trailing out-of-phase angle $\delta_x$ and a leading out-of-phase angle $\lambda_x$. For values of x from 1 through n/2, $\delta_x = \lambda_x$ and has magnitude of zero or greater. For values of x from (n/2+1) through n, $\delta_x = \lambda_x$ and has magnitude of zero or less. More specifically, at x=1 and (n/2+1), $\delta_x = \lambda_x = 0$. In addition, at x=n/2 and x=n, in absolute value $\delta_{n/2} = \lambda_{n/2} = -\delta_n = -\lambda_n$.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. An article processing machine, comprising:

a machine base;

a central turret carried by said machine base for rotation with respect thereto about a central turret axis;

a workpiece carrying means defining a workstation and transporting a workpiece through a processing cycle including receiving the workpiece into the workstation, conveying the workpiece in the workstation along a workpiece pathway about said central turret axis, and discharging the workpiece from the workstation;

a planetary turret orbiting the central turret axis, rotatable about a planetary turret axis, and carrying a plurality of tool heads along a tool head pathway positioned to successively bring each tool head to the workstation;

an index drive means for cycling a planetary turret about the planetary turret axis through alternating periods of indexed motion and dwell, wherein during successive periods of dwell, successive ones of said tool heads are positioned at the workstation; and means for operatively engaging a tool head positioned at the workstation with a workpiece carried at the workstation.

2. The article processing machine of claim 1, further comprising:

a central turret shaft aligned with the central turret axis and rotatable with respect to the machine base; and a trunnion carried by a single end of the machine base and supporting the central turret shaft from said single end of the base.

3. The article processing machine of claim 1, wherein said workpiece carrying means comprises a plurality of said workstations, and further comprising a plurality of said planetary turrets, wherein:

each planetary turret is associated with a separate one of the workstations;

the planetary turrets are arranged in at least two groups, in which the first group is carried at a first radial spacing from said central turret axis and the second group is carried at a second radial spacing different than said first radial spacing.

4. The article processing machine of claim 3, wherein said planetary turrets of the first group are nested between the planetary turrets of the second group; and the workstations associated with the first and second groups of planetary turrets are substantially at a single radial spacing from said central turret axis.

5. The article processing machine of claim 1, wherein said tool heads comprise necking dies for necking-in the ends of tubular workpieces.

6. The article processing machine of claim 5, wherein said necking die tool heads of each planetary turret are of different neck sizes and are sequentially arranged on each turret for successive arrival at said associated workstation in order of decreasing size during a processing cycle of a single workpiece.

7. The article processing machine of claim 1, wherein said index drive means comprises:

a bull gear centered on said central turret axis and in a stationary position with respect to said base;

a pinion gear engaging said bull gear and orbiting the bull gear with the rotation of said central turret;

an index drive input shaft connected to said pinion gear for rotation therewith;

a first lobed index cam connected to said index drive input shaft for rotation therewith;

a first index drive output shaft rotatably carried on the central turret, connected to a first planetary turret shaft, wherein the first planetary turret shaft carries a first planetary turret thereon for rotation therewith;

a first array of index follower rollers carried by said index drive output shaft at equidistant circumferential spacing and at a preselected radial spacing from the output shaft such that at least one of the first array of follower rollers contacts said index cam in driving engagement, intermittently advancing the index drive output shaft by a partial revolution with passage of each lobe of the first index cam.

8. The article processing machine of claim 7, wherein said index cam comprises a double lobe.

9. The article processing machine of claim 7, further comprising:

a second index cam connected to said index drive input shaft and phased 180° from said first index cam;

a second array of index follower rollers connected to said index drive output shaft at equidistant circumferential spacing and at said preselected radial spacing, such that at least one of the second array follower rollers contacts said second index cam in driving engagement, intermittently advancing the index drive output shaft by a partial revolution with passage of each lobe of the second index cam, wherein said second array of index follower rollers is phased by a preselected angle of rotation from said first array, such that the rollers of the second array are non-aligned with the rollers of the first array.

10. The article processing machine of claim 9, wherein: said first array said second array each comprise three rollers spaced 120° apart, and the first and second arrays are phased 60°.

11. The article processing machine of claim 9, further comprising:

a second index drive output shaft rotatably carried by the central turret, connected to a second planetary turret shaft, wherein the second planetary turret shaft carries a second planetary turret thereon for rotation therewith;

wherein said second output shaft is positioned diametrically opposite the first output shaft, with respect to a diameter of said index drive input shaft; and the second output shaft carries first and second arrays of follower rollers, substantially identical to those on the first output shaft, and said arrays on the second output shaft engage the first and second cams of the index drive input shaft.

12. The article processing machine of claim 11, wherein:

said planetary turrets are arranged in at least two groups, in which the first group is carried at a first radial spacing from said central turret axis;

the second group is carried at a second radial spacing different than said first radial spacing; and said first planetary turret is of said first group, and said second planetary turret is of said second group.

13. A method of sequentially processing a workpiece by a plurality of tool heads, comprising:

first, providing plurality of tool heads, each capable of processing a workpiece located in a processing relationship thereto, and moving the tool heads along an annular tool head path in an index cycle of alternating periods of index movement and dwell, wherein at least one dwell position of each tool head is at a predetermined common point along the tool head path;

second, simultaneously with said first step, providing a workpiece station moving along an annular workpiece path;

third, simultaneously with said second step, orbiting the tool head path about the workpiece path for movement with the workpiece station;

fourth, simultaneously with said third step, positioning said predetermined common point of the tool head path in sufficient proximity to the workpiece station that a tool head dwelling at the common point is positioned in processing relationship to a workpiece carried at the workpiece station;

fifth, placing a workpiece in said workpiece station for movement therewith; and sixth, conveying the workpiece along the workpiece path through a plurality of tool head index cycles, whereby the workpiece is processed by a plurality of the tool heads.

14. The method of claim 13, further comprising in said sixth step, moving the tool heads through the index cycle at least as many times as there are tool heads on the tool head path, such that each tool head processes the workpiece at least once.

15. The method of claim 14, wherein said sixth step is performed within one revolution of the workpiece station.

16. The method of claim 14, further comprising as a seventh step after completion of said sixth step, moving the tool heads through a further index cycle having a dwell period at which none of the tool heads is positioned at the predetermined point.

17. The method of claim 14, further comprising, as an eighth step, during said seventh step, removing the workpiece from the workpiece station.

18. The method of claim 17, further comprising, after the conclusion of said eighth step and simultaneously with said seventh step, providing another workpiece to the workpiece station.

19. An improved article processing machine of the type having a base carrying a central turret powered for rotation about a central turret axis; a workpiece carrying means for transporting a workpiece about the central turret axis at a workstation; a plurality of tool heads carried by the central turret with at least one of the tool heads positionable at the workstation; and means for operatively engaging the workpiece with the tool head positionable at the workstation; wherein the improvement comprises:

a planetary turret rotatable about a planetary turret axis, wherein the planetary turret axis orbits the central turret axis; and the planetary turret carries a plurality of said tool heads at a predetermined radial separation from the planetary turret axis for orbital rotation about the planetary turret axis;

an index drive means for moving the planetary turret through repeated cycles of dwell and index movement about the planetary turret axis, wherein during a dwell the index drive means maintains one of the carried tool heads at said workstation; and during an index movement the index drive means changes the tool head at the workstation.

20. An improved article processing machine of the type having a base carrying a central turret powered for rotation about a central turret axis; a workpiece carrying means for transporting a workpiece about the central turret axis at a workstation; a plurality of tool heads carried by the central turret with at least one of the tool heads positionable at the workstation; and means for operatively engaging the workpiece with the tool head positionable at the workstation; wherein the improvement comprises:

a planetary turret rotatable about a planetary turret axis, wherein the planetary turret axis orbits the central turret axis; and the planetary turret carries a plurality of said tool heads at a predetermined radial separation from the planetary turret axis for orbital rotation about the planetary turret axis;

a drive means for moving each of said tool heads through a plurality of n index cycles during a single revolution of the central turret, wherein during a first half of said revolution a tool head moves through a plurality of m index cycles including dwell sectors, $\alpha_1-\alpha_m$, at respective radii $R_1 \ldots R_m$ wherein R increases from $R_1$ to $R_m$; and wherein during a second half of said revolution the tool head moves through a plurality of m index cycles including dwell sectors $\alpha_{m+1}-\alpha_n$, at respective radii $R_{m+1} \ldots R_n$, wherein R decreases from $R_{m+1}$ to $R_n$.

21. The improved article processing machine of claim 20, wherein radius $R_{m+1}$ is greater than radius $R_m$.

22. The improved article processing machine of claim 20, wherein radius $R_n$ is greater than radius $R_1$.

23. The improved article processing machine of claim 20, wherein said predetermined radial separation from the planetary turret axis is $R_T$ and the path defined by said tool head approximates an irregular circle having its center offset from the central turret axis by approximately the distance $R_T$.

24. The improved article processing machine of claim 20, wherein each index sector $\alpha_1-\alpha_n$ is equal to $\alpha_{dwell}$.

25. The improved article processing machine of claim 24, wherein each $\alpha_{dwell}=\frac{1}{2}\Theta$, wherein $\Theta$ is the index cycle.

26. The improved article processing machine of claim 20, wherein:

during a single revolution of the central turret, a tool head carried by said planetary turret moves through dwell sectors $\alpha_x$ where x ranges from 1 to n, and each sector $\alpha_x$ is offset by a trailing out-of-phase angle $\delta_x$, measured between radii $R_x$ and $R_{TT}$ at the trailing edge of $\alpha_x$; and wherein each sector $\alpha_x$ is offset by a leading out-of-phase angle $\lambda_x$, measured between radii $R_x$ and $R_{TT}$ at the leading edge of $\alpha_x$;

where $R_{TT}$=radius from the central turret axis to the planetary turret axis and $R_1 \ldots R_n$=respective radius between the central turret axis and the axis of a tool head measured consecutively in each of dwell periods $\alpha_1-\alpha_n$ for x=1 to x=n/2, $\delta_x=\lambda_x$ and is zero to greater, and for x=n/2 to x=n, $\delta_x=\lambda_x$ and is zero to less.

* * * * *